Patented Oct. 28, 1952

2,615,802

UNITED STATES PATENT OFFICE 2,615,802

HERBICIDAL COMPOSITION AND METHOD

Harold E. Bruner, Akron, Ohio, assignor to Monsanto Chemical Company, St. Louis, Mo., a corporation of Delaware No Drawing. Application October 23, 1948, Serial No. 56,249

15 Claims. (Cl. 71—2.7)

This invention relates to the control and destruction of noxious vegetation by means of a new and effective class of herbicides. More particularly it relates to methods and compositions for destroying weeds rapidly by means of a lethal concentration of an alkyl xanthic sulfide.

A wide variety of chemical substances for destruction or control of weed growth by chemical action have been suggested and despite the extensive use of several, none are entirely satisfactory. Among the more widely known herbicides are the chlorates, arsenic compounds, cyanamides, thiocyanates, carbon disulfide, and sulfuric acid. All of these materials are low in unit cost, but high in cost per acre when applied in sufficient quantities to kill the weeds. Moreover, many of the well known weed killers are selective in action, that is they destroy only the less resistant varieties such as shallow rooted perennials and do not affect the more refractory or resistant weeds, while others only destroy the tops of the plants. Many have deleterious residual effect on the soil and have been known to sterilize the soil for long periods while others lose their toxicity rapidly upon absorption in the soil. Most of them are corrosive and difficult to handle and many are health hazards to humans and animals. Several are harmful to the desirable plants while others encourage fungus growth.

It is the object of this invention to minimize the above described disadvantages characteristic of the well known herbicides and particularly to provide the art with a new class of efficient, inexpensive, fast acting herbicides which are safe to use as well as highly effective.

In accordance with this invention it has been discovered that aliphatic xanthic sulfides are efficient, fast acting herbicides. In general, it has been found that compounds of the structure

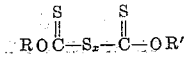

R and R' representing aliphatic radicals and $x$ an integer greater than one, are effective herbicides. Typical examples of R and R' are the alkyl and substituted alkyl radicals methyl, ethyl, propyl, isopropyl, butyl, isobutyl, amyl, isoamyl, hexyl, cyclohexyl, methyl cyclohexyl, methoxy ethyl, ethoxy ethyl, chloromethyl, chloroethyl, and octyl radicals. However, the presence of aromatic groups is to be avoided. For example compounds in which R and R' are phenethyl or furfuryl radicals are substantially ineffective.

The new herbicides may be made readily and cheaply by well known methods, for example the disulfides are prepared by simply oxidizing an aliphatic xanthate; the trisulfides readily form by treating an aliphatic xanthate with sulfur dichloride, and the tetrasulfides are made by condensing sulfur monochloride with an aliphatic xanthate. They may be used with substantially equal effectiveness in the pure or crude state. As exemplary of the new herbicides the following chemicals are illustrative: bis(methyl xanthic) disulfide, bis(ethyl xanthic) disulfide, bis(isopropyl xanthic) disulfide, bis(tertiary amyl xanthic) disulfide, bis(chlor methyl xanthic) disulfide, bis(β-methoxy ethyl xanthic) disulfide, bis(β-ethoxy ethyl xanthic) disulfide and the corresponding trisulfides, tetrasulfides and higher polysulfides.

Small quantities of the aliphatic xanthic sulfides are sufficient for effective destruction and the new herbicides not only destroy weed growth rapidly but also inhibit fungus growth, mold, and the like. The aliphatic xanthic sulfides are permanent in their phytocidal action in that there is no immediate appearance of weed growth. The new herbicides are not detrimental to the health of humans or animals nor are they unduly corrosive. The new herbicides may be used in emulsions, suspensions, solutions, or in a powder form with great ease and efficiency. The new herbicides may be employed more advantageously in an oil-in-water emulsion.

In the preparation of a dust or powder composition, the new herbicides may be admixed with such materials as talc, pyrophylite, various clays, fuller's earth, diatomaceous earth, and the like and applied to the plants with the usual standard applicators. A hygroscopic material may also be incorporated where desired.

In the preparation of a spray composition of an aliphatic xanthic sulfide various materials of secondary nature may be added to the composition. Thus, for example, to disperse the new herbicides in water or other suitable liquid carrier, wetting agents such as sulfated alcohols, alkylated aromatic sulfonic acids, amino soaps, etc., may be added. Aliphatic xanthic sulfides dissolved in aromatic oils or other common organic solvents upon emulsification in water produce a spray composition which is particularly advantageous. Gum such as karaya gum may be added to increase the adherence of the composition to the foliage. A hygroscopic material may be included in the composition also. The exact proportion of herbicide employed is dependent upon the nature of the plants to be controlled, the time of the year, the surrounding vegetation, the presence or absence of other materials such as wetting agents, diluents, carriers, etc., and the amount of finished spray or dust to be applied per acre. No general rule can be set out since each individual case presents individual problems, although it may be stated that the aliphatic xanthic sulfides are extremely active in small amounts and that there is little or no deleterious after-effects which usually accompanies large concentrations of many well known herbicides. Under conditions wherein a growing crop is not a consideration the maximum concentration is of little or no importance.

The new herbicide may be used in admixture with other herbicides where convenient or desirable. Mineral oil fractions are commonly used for their herbicidal properties and the xanthic sulfides are advantageously used to fortify such oils and enhance their killing power. The xanthic sulfides are soluble in the usual horticultural oils which comprise mineral oil fractions high in aromatic constituents. The resulting solution may then be applied directly to the plants but it is preferred to employ it in the form of an oil-in-water emulsion. Other herbicides with which xanthic sulfides may be used include sodium pentachlor phenate, pentachlorphenol, and nitro phenols.

As exemplary of the invention the following specific embodiments are illustrative and are not to be construed as limitative thereof.

*Example 1*

Bis(ethyl xanthic) disulfide was dissolved in acetone and emulsified in water with the aid of the sodium salt of an alkylated aromatic sulfonic acid. The emulsion was applied by conventional spray methods to greenhouse flats planted to sugar beets and corn. Weeds in the flats were 2 to 3 inches high. Application was made before emergence at the rate of 7 pounds of the disulfide per acre. Examination at regular intervals following the application showed substantially 100% control of weeds without any noticeable effect upon the corn or sugar beets when they emerged from the soil.

*Example 2*

Bis(ethyl xanthic) disulfide in the form of an aqueous dispersion was sprayed at the rate of 10 pounds of herbicide per acre to a plot of ground containing potatoes, planted about one month, and weeds about 1 to 5 inches tall. A few of the potato plants were up at the time of application. Complete control of weed growth without any injury to the potato plants or soil was attained. Rapid killing of the weeds was evident from observations 24 hours after application and after 28 days there were substantially no weeds and no evidence of injury to the potatoes.

*Example 3*

Substantially 5 pounds of bis(methyl xanthic) disulfide was dissolved in 5 gallons of an aromatic mineral oil and then the oil solution emulsified in water so that the final composition had a volume of 50 gallons. This composition was applied at the rate of 50 gallons to the acre to a vegetable plot planted to corn, cucumbers, beans, beets, tomatoes, carrots, and other vegetables. At the end of 15 days only a little grass and a few weeds remained. The vegetable plants emerged unimpaired. After 2½ months the vegetable plants still showed no evidence of injury.

*Example 4*

Vegetable plots planted to seven types of vegetable seeds and infested with weeds were treated with an aromatic oil-in-water emulsion of several alkyl xanthic sulfides at the rate of 10 pounds of the sulfide per acre. The sulfides were dissolved in the oil containing an emulsifier and then emulsified. Fourteen days after treatment the following results were observed using the tabulated herbicides:

Bis(ethyl xanthic) trisulfide—almost perfect weed control; no crop injury
Bis(isopropyl xanthic) disulfide—100% weed control; no crop injury
Bis(ethyl xanthic) disulfide—weeds all killed; no crop injury
Bis(methoxy ethyl xanthic) disulfide—weeds controlled, some grass remained but no crop injury.

*Example 5*

Bis(ethyl xanthic) disulfide was applied to plantings of sugar beets before emergence of the crop. The quantity applied per acre varied from 4 to 12 pounds, all applications being in the form of aqueous emulsions. Weed control was evident over the entire range of concentrations without injury to the beets except that the highest quantity showed slight retardation.

*Example 6*

Xanthic sulfides were applied to weeds in growing corn. Bis(ethyl xanthic) disulfide was applied at the rate of 3½ pounds per acre dissolved in 5 gallons of a mineral oil high in aromatic constituents. The solution was then emulsified in water and applied in emulsion form. Although the leaves of the corn were temporarily decolorized wherever the emulsion touched them, subsequent examination showed no evidence of injury. On the other hand, excellent control of the weeds was observed.

A slightly higher kill of weeds was obtained with 6 pounds of bis(isopropyl xanthic) disulfide dissolved in 2½ gallons of oil also applied in the form of an aqueous emulsion.

*Example 7*

To a plot planted to eight vegetables on June 30 there was applied on July 2 a herbicidal emulsion of bis(ethyl xanthic) disulfide in water. The application was at the rate of 10 pounds of the disulfide per acre. Observation of the plot on July 22 showed that the weeds and grass were effectively controlled. Grass was then just starting to grow.

*Example 8*

To a field badly infested with purslane as well as other weeds solutions of bis(ethyl xanthic) disulfide in a mineral oil containing a high proportion of aromatic constituents were applied. 3½ pounds of bis(ethyl xanthic) disulfide dissolved in 5 gallons of the oil was applied per acre in one case. Other applications comprised 10 pounds of the disulfide in 5 gallons of oil per acre and 10 pounds of the disulfide in 1 gallon of oil per acre. These oil solutions were emulsified in water and used in this form. Finally, bis(ethyl xanthic) disulfide emulsified in water without any oil was applied at the rate of 10 pounds of the disulfide per acre. Excellent control of the weeds was secured with each formulation.

*Example 9*

Willows 5 feet high were sprayed with equal parts by weight of bis(ethyl xanthic) disulfide and sodium pentachlor phenate in the form of a water dispersion. 7 pounds of each per acre was applied. The willows appeared to be dead a week later. This was confirmed by subsequent observation a month later. Similarly, a miscellaneous array of smaller plants beneath the willows were removed with the exception of mint which showed no ill effects.

The aliphatic xanthic sulfides are particularly useful in destroying such noxious vegetation as field bindweed, chickweed, pigweed, dandelions, thistles, nettles, dock, mustard, wild radish, wild morning glory, purslane, plantain, ragweed, lamb's-quarters, mallo, smartweed, shepherd's purse, yarrow, wild carrot, and the like.

While specific embodiments of the invention have been described, it will be understood that variations may be made without departing from the nature or scope of the invention, for example other diluents, carriers, wetting and dispersing agents than those described may be used. The new herbicides may be used in conjunction with other less effective herbicides or admixed with fungicides and insecticides for particular purposes.

What is claimed is:

1. The method of destroying noxious vegetation which comprises uniformly applying to the foliage thereof a lethal concentration of a herbicidal composition containing as the essential active ingredient a member of the group of compounds of the general formula $$RO-\underset{S}{\overset{S}{\overset{\|}{C}}}-S_x-\underset{S}{\overset{S}{\overset{\|}{C}}}-OR$$

where $x$ is a whole number greater than one but less than five and where R is a member of the group consisting of alkyl and substituted alkyl radicals.

2. The method of destroying noxious vegetation which comprises uniformly applying to the foliage thereof a lethal concentration of a herbicidal composition comprising a wetting agent and as the essential active substituent a symmetrical aliphatic xanthic polysulfide.

3. The method of destroying noxious vegetation which comprises uniformly applying to the foliage thereof a lethal concentration of a herbicidal composition comprising a wetting agent and as the essential active substituent a symmetrical aliphatic xanthic disulfide.

4. The method of destroying noxious vegetation which comprises uniformly applying to the foliage thereof a lethal concentration of a herbicidal composition comprising a symmetrical aliphatic xanthic polysulfide as the essential active ingredient dispersed in a liquid carrier.

5. The method of destroying noxious vegetation which comprises uniformly applying to the foliage thereof a lethal concentration of a herbicidal spray composition comprising a solution of the essential active ingredient a symmetrical aliphatic xanthic polysulfide in an organic solvent emulsified in water.

6. The method of destroying noxious vegetation which comprises uniformly applying to the foliage thereof a lethal concentration of a herbicidal spray composition comprising a solution of the essential active ingredient a symmetrical aliphatic xanthic polysulfide in an aromatic oil solvent emulsified in water.

7. The method of destroying noxious vegetation which comprises uniformly applying to the foliage thereof a lethal concentration of a herbicidal composition comprising bis(ethyl xanthic) disulfide as the essential active ingredient dispersed in a carrier.

8. The method of destroying noxious vegetation which comprises uniformly applying to the foliage thereof a lethal concentration of a herbicidal composition comprising a wetting agent and as the essential active ingredient bis(ethyl xanthic) disulfide.

9. The method of destroying noxious vegetation which comprises uniformly applying to the foliage thereof a lethal concentration of a herbicidal composition comprising a solution of the essential active ingredient bis(ethyl xanthic) disulfide in an aromatic oil solvent emulsified in water.

10. A method of killing plant life which comprises uniformly applying to the foliage of living plants a lethal concentration of a compound having the formula $$R-O-\underset{S}{\overset{}{\overset{\|}{C}}}-(S)_x-\underset{S}{\overset{}{\overset{\|}{C}}}-O-R$$

where R is an alkyl hydrocarbon radical and $x$ is an integer greater than 1 but less than 5.

11. A method of killing plant life which comprises uniformly applying to the foliage of living plants a lethal concentration of bis-ethylxanthogen having the formula:

$$C_2H_5-O-\underset{S}{\overset{}{\overset{\|}{C}}}-S-S-\underset{S}{\overset{}{\overset{\|}{C}}}-O-C_2H_5$$

12. A herbicidal composition comprising a mineral hydrocarbon oil fraction high in aromatic constituents having herbicidal properties and having dissolved therein in such amount that the herbicidal activity is increased a compound of the structure $$RO-\underset{}{\overset{S}{\overset{\|}{C}}}-S_x-\underset{}{\overset{S}{\overset{\|}{C}}}-OR$$

where $x$ is a whole number greater than one but less than five and where R is a member of the group consisting of alkyl and substituted alkyl radicals.

13. A herbicidal composition comprising a mineral hydrocarbon oil fraction high in aromatic constituents having herbicidal properties and having dissolved therein in such amount that the herbicidal activity is increased bis(ethyl xanthic) disulfide.

14. The method of destroying noxious plant growth which comprises applying to the surface of the ground before the crop emerges a lethal concentration of a compound having the structure $$RO-\underset{}{\overset{S}{\overset{\|}{C}}}-S_x-\underset{}{\overset{S}{\overset{\|}{C}}}-OR$$

where R is an alkyl hydrocarbon radical and $x$ is an integer greater than one but less than five.

15. The method of destroying noxious plant growth which comprises applying to the surface of the ground before the crop emerges a lethal concentration of a compound having the structure $$C_2H_5O-\underset{}{\overset{S}{\overset{\|}{C}}}-S-S-\underset{}{\overset{S}{\overset{\|}{C}}}-OC_2H_5$$

HAROLD E. BRUNER.

REFERENCES CITED

The following references are of record in the file of this patent:

UNITED STATES PATENTS

| Number | Name | Date |
|---|---|---|
| 2,250,545 | Mikeska | July 29, 1941 |
| 2,390,941 | Jones | Dec. 11, 1945 |
| 2,431,010 | Zimmer | Nov. 18, 1947 |

OTHER REFERENCES

Manufacturing Chemist, August 1944, page 294.